(12) United States Patent
Kumano

(10) Patent No.: US 8,838,341 B2
(45) Date of Patent: Sep. 16, 2014

(54) ELECTRIC DRIVE STEERING LOCKING APPARATUS

(75) Inventor: Masakazu Kumano, Hiroshima (JP)

(73) Assignee: U-Shin Ltd., Tokyo (JP)

( * ) Notice: Subject to any disclaimer, the term of this patent is extended or adjusted under 35 U.S.C. 154(b) by 133 days.

(21) Appl. No.: 13/275,785

(22) Filed: Oct. 18, 2011

(65) Prior Publication Data

US 2012/0101686 A1 Apr. 26, 2012

(30) Foreign Application Priority Data

Oct. 20, 2010 (JP) ................................ 2010-235781

(51) Int. Cl.
 *B62D 6/00* (2006.01)
 *B60R 25/0215* (2013.01)
 *B60R 25/02* (2013.01)
(52) U.S. Cl.
 CPC ........... *B60R 25/02153* (2013.01); *B60R 25/02* (2013.01)
 USPC ................... 701/42; 701/48; 701/72; 70/186; 708/831; 318/293; 324/770; 180/444; 440/1
(58) Field of Classification Search
 USPC ......... 701/48, 72; 70/186; 708/831; 318/293; 324/770; 180/444; 440/1
 See application file for complete search history.

(56) References Cited

U.S. PATENT DOCUMENTS

| | | | | |
|---|---|---|---|---|
| 5,574,344 A | * | 11/1996 | Matsuoka et al. | ............ 318/293 |
| 6,233,986 B1 | * | 5/2001 | Suzuki et al. | .................... 70/186 |
| 7,412,858 B2 | * | 8/2008 | Tsukano et al. | ................. 70/186 |
| 2006/0020656 A1 | * | 1/2006 | Hasegawa et al. | ............ 708/831 |
| 2006/0038580 A1 | * | 2/2006 | Hasegawa et al. | ............ 324/770 |
| 2007/0193821 A1 | * | 8/2007 | Imagaki et al. | ................ 180/444 |
| 2008/0015764 A1 | * | 1/2008 | Watanabe | ........................ 701/72 |
| 2008/0261466 A1 | * | 10/2008 | Kishibata et al. | ................. 440/1 |
| 2010/0100287 A1 | * | 4/2010 | Kasai et al. | ..................... 701/48 |

FOREIGN PATENT DOCUMENTS

| | | |
|---|---|---|
| JP | 2003-63354 | 3/2003 |
| JP | 2005-219614 | 8/2005 |
| JP | 2007-151300 | 6/2007 |

* cited by examiner

*Primary Examiner* — James Trammell
*Assistant Examiner* — Sanjeev Malhotra
(74) *Attorney, Agent, or Firm* — Wenderoth, Lind & Ponack, L.L.P.

(57) ABSTRACT

An electric drive steering locking apparatus according to an embodiment of the invention includes an electric motor, a motor driving control unit that allows the motor to perform locking actuation or unlocking actuation, a lower-level microcomputer that outputs an unlocking actuation signal and a locking actuation signal to the motor driving control unit, a first switching unit that electrically connects and disconnects a power supply route from the motor driving control unit to the motor, a checking power supply that applies a predetermined voltage to the electric motor; a switch unit that electrically connects and disconnects the checking power supply and the motor; a first diagnostic unit that outputs a voltage corresponding to an internal resistance of the electric motor; and a motor breakdown determination unit (lower-level microcomputer) that determines a breakdown of the electric motor by the voltage input from the first diagnostic unit.

4 Claims, 11 Drawing Sheets

| Determination point | | Input | | | | Determination |
|---|---|---|---|---|---|---|
| During unlocking/locking actuation | First switching unit | First diagnostic unit | | M→L | | Normal |
| | Second switching unit | Third diagnostic unit | | L→H | | Normal |
| During unlocking actuation | Unlocking relay | First diagnostic unit | | L | | Normal |
| | | Second diagnostic unit | | H | | |
| During locking actuation | Locking relay | First diagnostic unit | | H | | Normal |
| | | Second diagnostic unit | | L | | |
| During motor breakdown determination | Motor | First diagnostic unit | | M | | Normal |
| | Motor | First diagnostic unit | | H | | Open breakdown |
| | Second switching unit | First diagnostic unit | L | Third diagnostic unit | H | On breakdown |
| | Motor | | | | L→H | Short-circuit breakdown |
| | First switching unit | | | | L→L | On breakdown |

Fig. 3

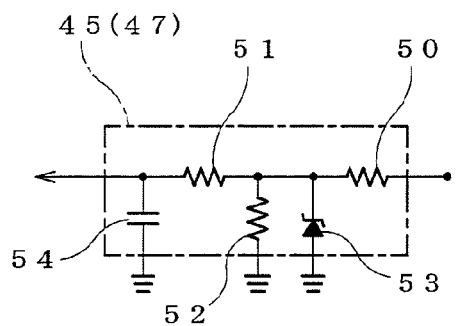

Fig. 4

|  | Determination point | Input |  |  | Determination |
|---|---|---|---|---|---|
| During unlocking/locking actuation | First switching unit | First diagnostic unit | M→L |  | Normal |
|  | Second switching unit | Third diagnostic unit | L→H |  | Normal |
| During unlocking actuation | Unlocking relay | First diagnostic unit | L |  | Normal |
|  |  | Second diagnostic unit | H |  |  |
| During locking actuation | Locking relay | First diagnostic unit | H |  | Normal |
|  |  | Second diagnostic unit | L |  |  |
| During motor breakdown determination | Motor | First diagnostic unit | M |  | Normal |
|  | Motor | First diagnostic unit | H |  | Open breakdown |
|  | Second switching unit | First diagnostic unit | L | Third diagnostic unit | H | On breakdown |
|  | Motor |  |  |  | L→H | Short-circuit breakdown |
|  | First switching unit |  |  |  | L→L | On breakdown |

Fig. 5
(A)
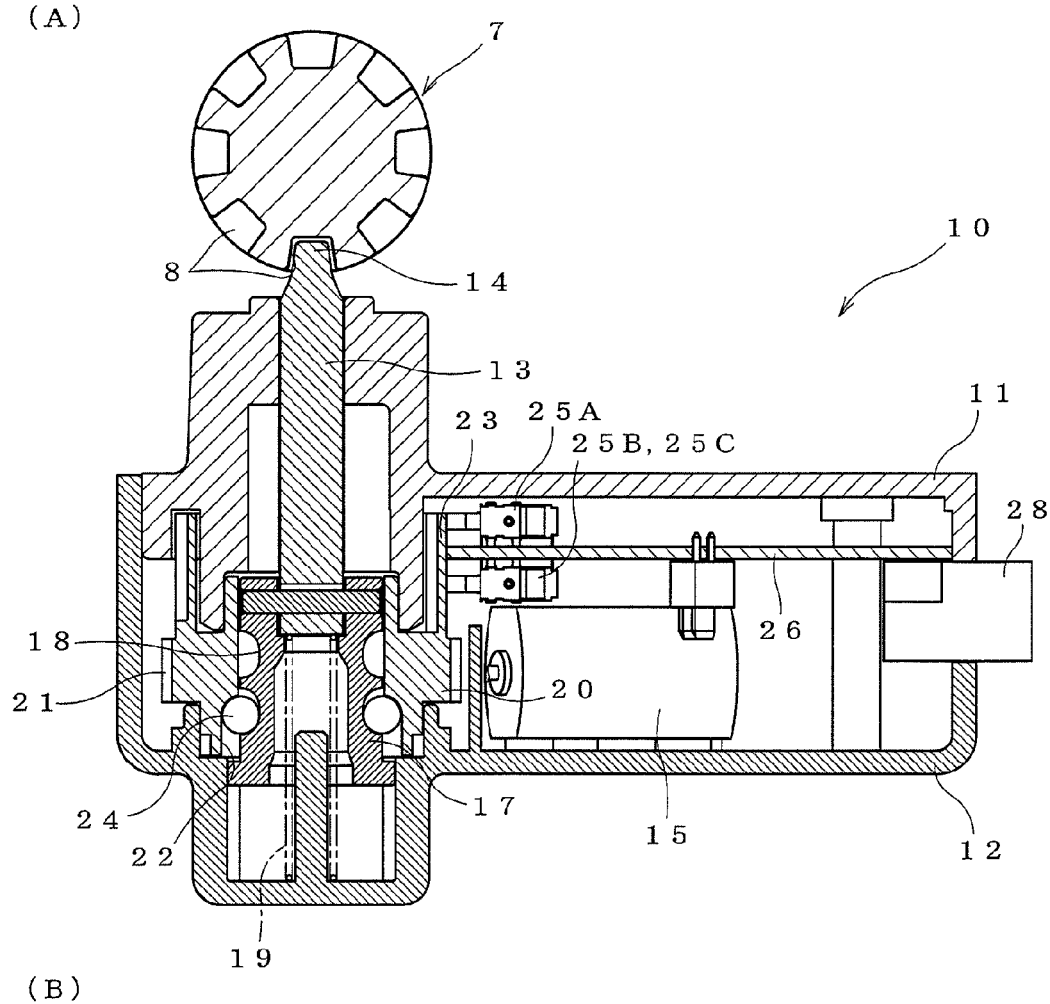
(B)
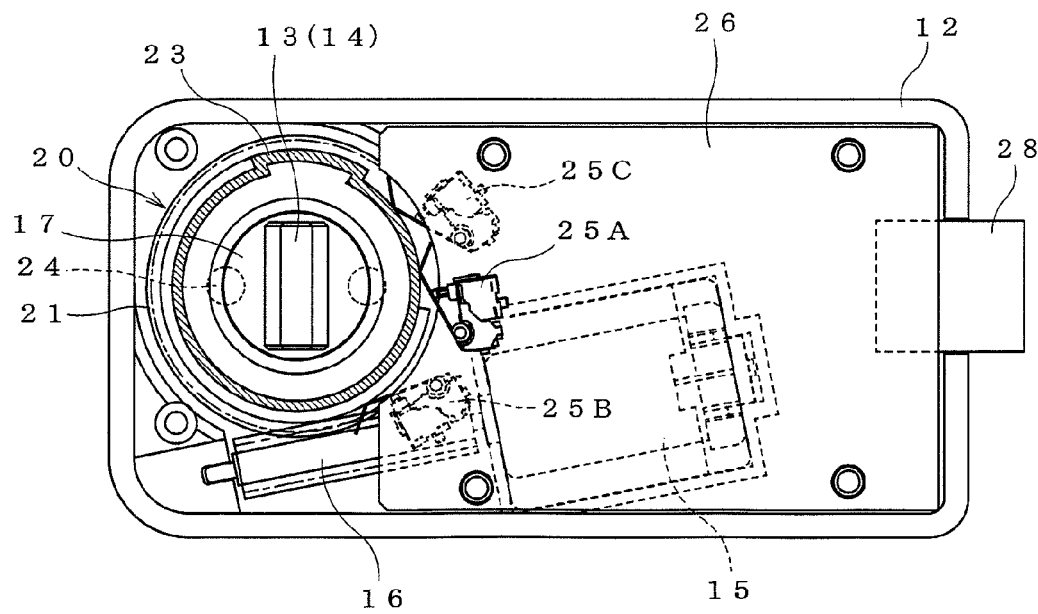

ELECTRIC DRIVE STEERING LOCKING APPARATUS

BACKGROUND OF THE INVENTION

1. Field of the Invention

The present invention relates to an electric drive steering locking apparatus.

2. Description of Related Art

This kind of electric drive steering locking apparatus includes a locking member that engages with and disengages from a steering shaft, a motor that actuates the locking member, a motor driving control unit that controls a current supplied to the motor and switches polarities of the current, and a microcomputer that causes the locking member to perform locking actuation and unlocking actuation through the motor driving control unit and the motor. During an engine operation, the locking apparatus maintains an unlocking situation to enable the steering. On the other hand, during the engine stop, the locking apparatus maintains a locking situation to disable the steering.

However, in the electric drive steering locking apparatus, when the motor driving control unit breaks down in an on-actuation state to cause the locking member to perform the locking actuation, the steering is disabled to generate a probability leading to a large accident.

For example, in Japanese Patent Publication Laid-Open No. 2003-63354, a switch is provided on a feeding route from the power supply to the motor, and the power is not supplied to the motor by the switch during driving of the vehicle. Therefore, even if the on-breakdown is generated in the motor driving control unit, the locking member is prevented from mistakenly engaging with the steering shaft during driving.

However, the electric drive steering locking apparatus of Japanese Patent Publication Laid-Open No. 2003-63354 cannot deal with a case in which the motor that actuates the locking member breaks down. In the state in which the motor breaks down, because the electric drive steering locking apparatus cannot be actuated, the steering shaft cannot be unlocked.

In order to prevent a trouble caused by the breakdown of the motor, it is necessary to periodically check the existence or non-existence of the breakdown of the motor. For example, it is conceivable that, before the motor is driven, a current is passed to an extent in which the motor is not actuated and the existence or non-existence of the breakdown is checked by determining an internal resistance value of the motor. However, in the electric drive steering locking apparatus of Japanese Patent Publication Laid-Open No. 2003-63354, both electrodes of the motor are connected to the power supply side or the ground side to put the motor into the stop state. Therefore, it is difficult to pass the breakdown checking current through the motor in the stop state, and the breakdown of the motor cannot be checked.

SUMMARY OF THE INVENTION

An object of the invention is to provide an electric drive steering locking apparatus that can improve the safety against the breakdown.

In accordance with one aspect of the invention, an electric drive steering locking apparatus includes:

a motor that actuates a locking member engaging with and disengaging from a steering shaft of a vehicle;

a motor driving control unit that switches polarities of a driving current supplied from a main power supply to the motor, disconnects the driving current, and allows the motor to perform locking actuation or unlocking actuation of the locking member;

a microcomputer that selectively outputs an unlocking actuation signal causing the locking member to perform the unlocking actuation and a locking actuation signal causing the locking member to perform the locking actuation to the motor driving control unit;

a first switching unit that electrically connects and disconnects one side of a power supply route from the motor driving control unit to the motor;

a checking power supply that is connected between the first switching unit and the motor to apply a predetermined voltage to the motor;

a switch unit that electrically connects and disconnects a check current supplied from the checking power supply to the motor;

a first diagnostic unit that is connected on a route from the checking power supply to the motor to output a voltage corresponding to an internal resistance of the motor; and a motor breakdown determination unit that determines a breakdown of the motor by the voltage input from the first diagnostic unit.

In the electric drive steering locking apparatus, since the first switching unit is provided between the motor driving control unit and the motor, the current passed through the motor can be cut off when the electric drive steering locking apparatus is in the non-actuation state. Therefore, for example, even if the motor driving control unit has a breakdown in an on-state to supply an unintended power to the motor, the first switching unit can prevent the passage of the current through the motor. Accordingly, the motor can be prevented from unexpectedly rotating to cause the locking member to perform the locking actuation.

In the state in which both electrodes of the motor are grounded by the motor driving control, the first switching unit can prevent the current passed from the checking power supply from being passed through the motor driving control unit on the side opposite the motor. Therefore, the check current can securely be passed through the motor. Accordingly, the first diagnostic unit can detect the breakdown of the motor to improve the safety against the breakdown. The cutoff and connection of the main power supply and the cutoff of the checking power supply can be performed by the first switching unit, so that the number of components can be decreased.

Preferably the electric drive steering locking apparatus further includes:

a second diagnostic unit that is connected to the other side of the power supply route from the motor driving control unit to the motor to output a voltage at a connection point of the second diagnostic unit and the power supply route; and a motor-driving-control-unit breakdown determination unit that determines a breakdown of the motor driving control unit by detecting changes of the voltages output from the first diagnostic unit and the second diagnostic unit.

Because the breakdown of the motor driving control unit can be detected, the safety against the breakdown can further be improved. The first diagnostic unit is commonly used to detect the breakdowns of the motor and the motor driving control unit, so that the number of components can be suppressed.

Preferably the electric drive steering locking apparatus further includes:

a second switching unit that electrically connects and disconnects a power supply route from a main power supply to the motor driving control unit;

a third diagnostic unit that is connected between the second switching unit and the motor driving control unit to output a voltage at the connection point of the third diagnostic unit, the second switching unit and the motor driving control unit; and a switching-unit breakdown determination unit that determines the breakdown of the second switching unit by the voltage input from the third diagnostic unit.

Thus, the current can be prevented from being unexpectedly passed through the motor from the main power supply until the breakdowns are simultaneously generated in the first and second switching units and the motor driving control unit. Because the breakdown of the second switching unit can be detected through the third diagnostic unit, the safety against the breakdown can further be improved.

In the electric drive steering locking apparatus of the invention, because the current passed through the motor during the non-actuation can be cut off by the first switching unit, the motor can be prevented from unexpectedly rotating to cause the locking member to perform the locking actuation during driving. Because the first switching unit can prevent the current passed from the checking power supply from being passed through the motor driving control unit, the check current is securely passed through the motor, and the first diagnostic unit can detect the breakdown of the motor. Therefore, the safety against the breakdown can be improved.

BRIEF DESCRIPTION OF THE DRAWINGS

FIG. 3 is a circuit diagram illustrating a configuration of second and third diagnostic units;

FIG. 4 is a table illustrating a relationship between an output state of each diagnostic unit of FIG. 1 and a breakdown point;

FIG. 5A is a sectional view of the electric drive locking apparatus, and FIG. 5B is a plan view of the electric drive locking apparatus in a state in which a case is taken out;

DETAILED DESCRIPTION OF PREFERRED EMBODIMENTS

Hereinafter, an embodiment of the invention will be described with reference to the drawings.

Figure 1:
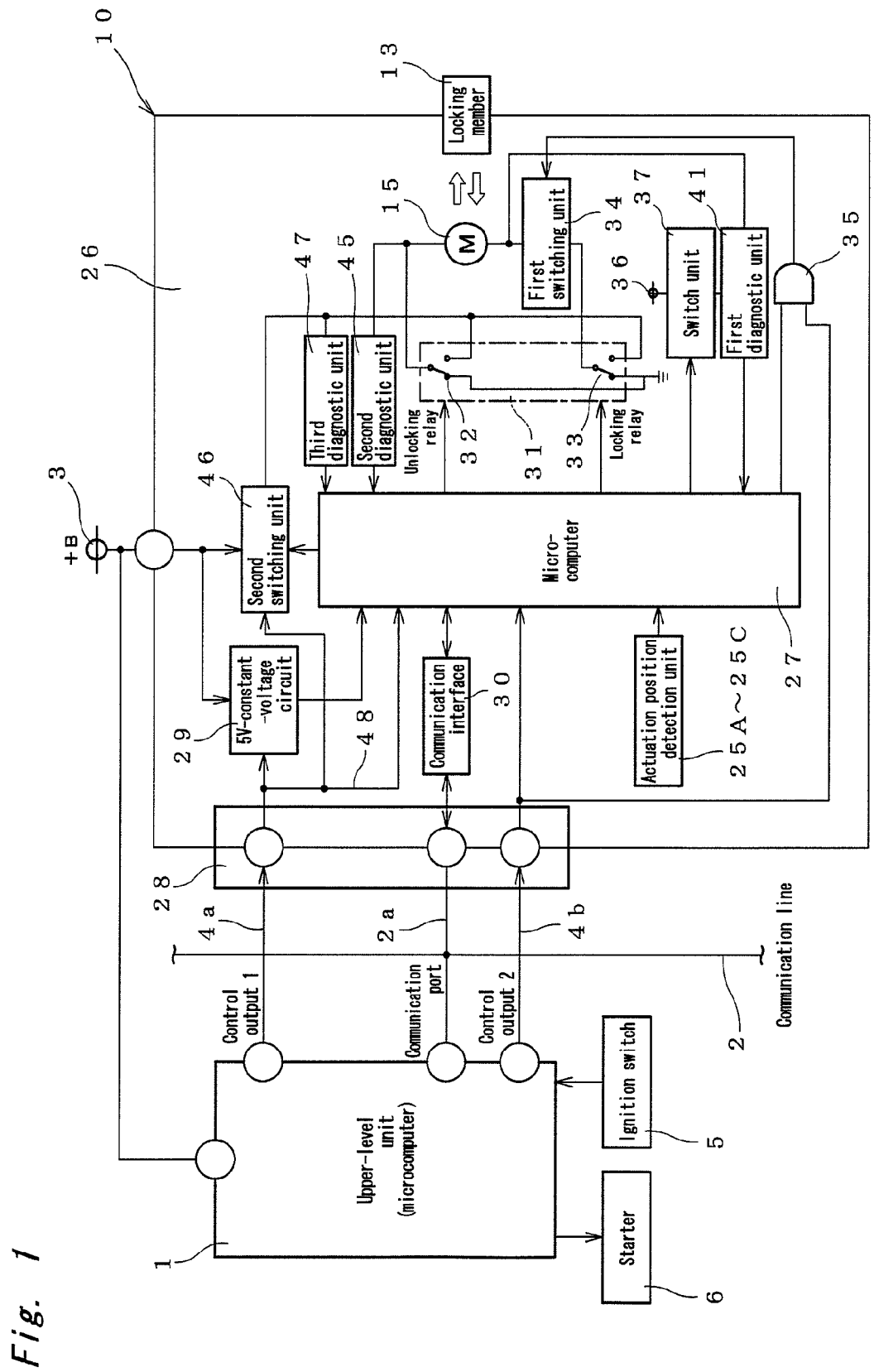
FIG. 1 is a circuit diagram illustrating a control circuit of an electric drive locking apparatus according to a first embodiment of the invention.
Figure 2:
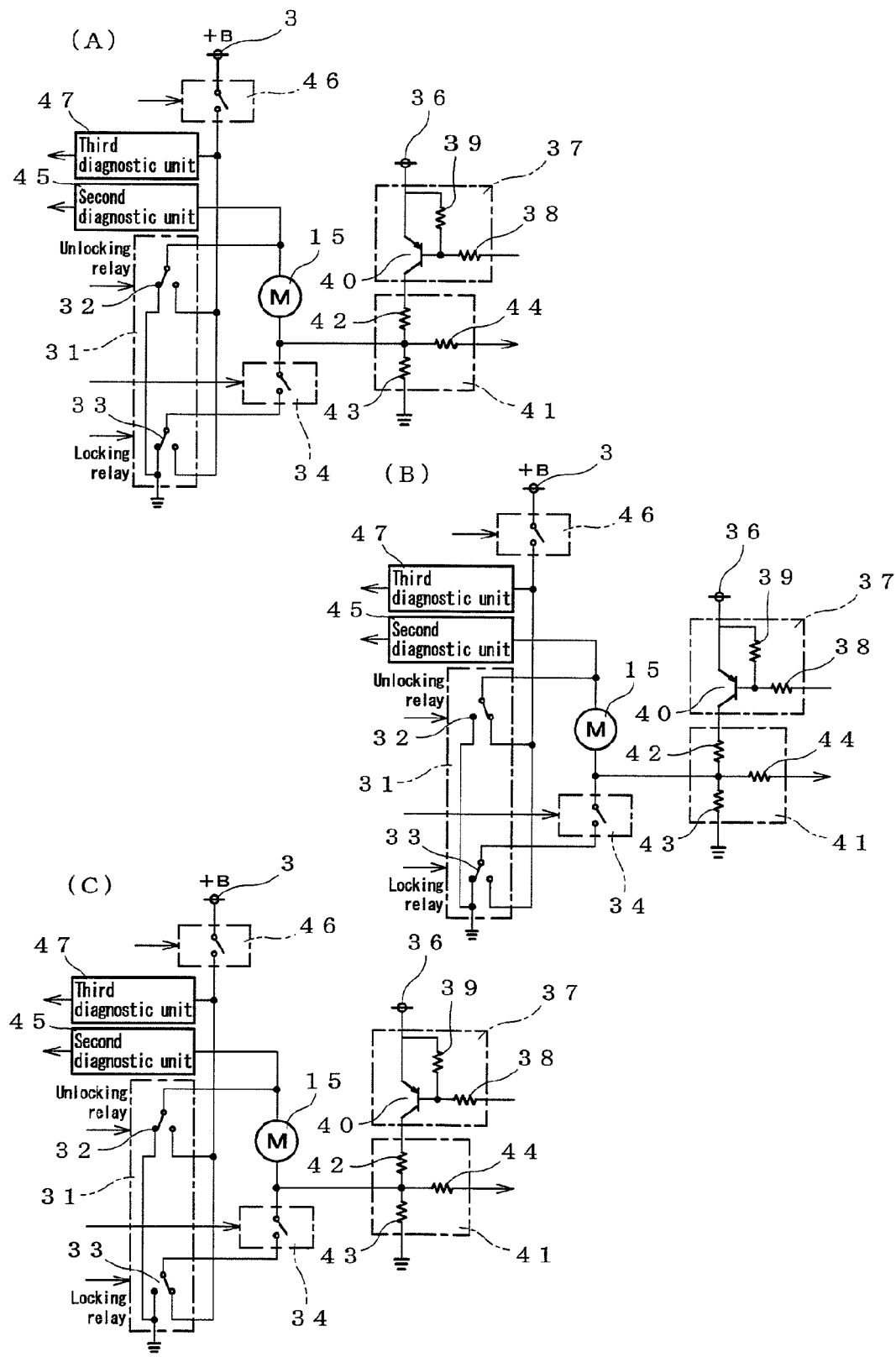
FIG. 2A is a circuit diagram illustrating a main part in a non-actuation state.
FIG. 2B is a circuit diagram illustrating the main part in an unlocked actuation state.
FIG. 2C is a circuit diagram illustrating the main part in a locked actuation state.

FIGS. 1 and 2 illustrate a control circuit of an electric drive steering locking apparatus (hereinafter referred to as a "locking apparatus") 10 of a vehicle according to a first embodiment of the invention. In the locking apparatus 10, one microcomputer (hereinafter referred to as a "lower-level microcomputer") 27 is mounted as control means. The lower-level microcomputer 27 performs unlocking actuation and locking actuation according to a control signal of a microcomputer (hereinafter referred to as an "upper-level microcomputer") 1 that is of upper-level unit control means mounted on the vehicle. In the embodiment, first to third diagnostic units 41, 45, and 47 are provided in the locking apparatus 10, which allows the breakdown of the locking apparatus 10 to be detected.

The upper-level microcomputer 1 is connected to the locking apparatus 10 through a communication line 2. The communication line 2 includes a communication line 2a through which a signal for causing the locking apparatus 10 to perform the unlocking actuation and the locking actuation and an actuation result are transmitted and received. To the upper-level microcomputer 1 is connected a pair of power supply control lines 4a and 4b for outputting a signal that electrically connects and disconnects a battery 3 that is of a main power supply and the locking apparatus 10. To the upper-level microcomputer 1 is also connected a push-switch type ignition switch 5 that starts up and stops an engine and a starter 6 that starts up the engine. When an operation of the ignition switch 5 is detected, the signal that causes the locking apparatus 10 to perform the unlocking actuation is output in the case that the engine is not actuated, and the engine is started up through the starter 6 when the locking apparatus 10 becomes the unlocked state. On the other hand, a signal that stops the engine to cause the locking apparatus 10 to perform the locking actuation is outputted in the case that the engine is actuated.

As illustrated in FIGS. 5A and 5B, the locking apparatus 10 is disposed around a steering shaft 7 that turns in association with a turning operation of a steering (not illustrated). The locking apparatus 10 causes a locking member 13 to perform the unlocking actuation to enable the steering through the steering shaft 7, and causes the locking member 13 to disable the steering to perform the locking actuation to disable the steering. In the steering shaft 7, engagement recesses 8 are circumferentially provided at predetermined intervals in an attaching position.

The locking apparatus 10 is provided with a casing having a case 11 whose one end is opened and a cover 12. In the casing, the locking member 13 that engages with the engagement recess 8, an electric motor 15 that advances and retreats the locking member 13, an actuator that transmits a driving force of the electric motor 15 to the locking member 13, and micro switches 25A to 25C that are of the actuation position detection unit of the locking member 13 are accommodated.

The locking member 13 is formed into a quadratic prism shape that can be inserted in an insertion hole of the case 11, and an engagement projection 14 that engages with and disengages from the engagement recess 8 of the steering shaft 7 is provided at an upper end of the locking member 13. The locking member 13 is provided so as to be advanced and retreated between a locking position where the engagement projection 14 advances from the case 11 to engage with the engagement recess 8 and an unlocking position where the engagement projection 14 is retreated in the case 11.

The electric motor 15 is a driving source that moves the locking member 13, and a worm 16 is provided on an output shaft of the electric motor 15. A motor that can perform normal rotation retreating the locking member 13 and reverse rotation advancing the locking member 13 is used as the electric motor 15. The normal rotation and the reverse rotation can be performed by switching polarities of a driving current passed through a pair of connection terminals.

The actuator includes a cam member 17 that is coupled to the locking member 13, a rotary gear 20 in which the cam member 17 is disposed so as to be able to be advanced and retreated, and a cam follower 24 that is disposed between the cam member 17 and the rotary gear 20.

The cam member 17 has a substantially cylindrical shape, a pair of cam grooves 18 and 18 is provided in an outer circumferential portion of the cam member 17, and the cam grooves 18 and 18 are recessed into a substantially semi-circular shape and radially opposed to each other so as to circle into a spiral shape. A spring 19 that biases the locking member 13 in an advancing direction is provided in the cam member 17. When the engagement projection 14 is not matched with the engagement recess 8, the spring 19 biases the locking member 13 in the advancing direction even if the locking member 13 is caused to perform the locking actuation. When the engagement projection 14 is matched with the engagement recess 8, the spring 19 advances the locking member 13 to cause the engagement projection 14 to engage with the engagement recess 8.

The rotary gear 20 has a cylindrical shape including a space in which the cam member 17 is accommodated. The rotary gear 20 is sandwiched between the case 11 and the cover 12 without moving in an axial direction, and the rotary gear 20 is retained while being able to rotate in a circumferential direction. A worm wheel 21 that engages with the worm 16 is provided in the outer circumferential surface of the rotary gear 20. A pair of vertical grooves 22 recessed into the substantially semi-circular shape is provided in a lower portion of an inner circumferential surface of the rotary gear 20 so as to be opposite each other in the radial direction. A switch cam unit 23 that turns on and off the micro switches 25A to 25C to detect the actuation position of the locking member 13 is provided on the upper side of the outer circumferential portion of the rotary gear 20.

The cam follower 24 is made of a spherical steel ball, the cam follower 24 is disposed in the vertical groove 22 of the rotary gear 20, and a portion projected from the vertical groove 22 is fitted in the cam groove 18 of the cam member 17. When the rotary gear 20 turns, the vertical groove 22 rotates circumferentially, and the cam follower 24 slides along the cam groove 18 of the cam member 17 to advance and retreat the locking member 13.

The micro switches 25A to 25C are mounted on a control board 26, which is provided in the case 11 and the cover 12, so as to be located in a middle portion of the switch cam unit 23 of the rotary gear 20. The micro switches 25A to 25C are normally opened switches that are turned on when the switch cam unit 23 presses a detection lever. The micro switches 25A to 25C detect the rotation position of the rotary gear 20 interlocked with the locking member 13, thereby indirectly detecting the actuation position of the locking member 13. When the rotary gear 20 rotates to the unlocking position, the switch cam unit 23 of the rotary gear 20 presses the detection levers of the micro switches 25A and 25B to turn on the micro switches 25A and 25B. When the rotary gear 20 rotates to the locking position, the switch cam unit 23 of the rotary gear 20 presses the detection lever of the micro switch 25C to turn on the micro switch 25C. That is, the first micro switch 25A detects whether the locking member 13 is moved to the unlocking position through the rotary gear 20 and the cam member 17. Similarly the second micro switch 25B detects whether the locking member 13 is moved to the unlocking position. The third micro switch 25C detects whether the locking member 13 is moved to the locking position. In the three micro switches 25A to 25C, the two micro switches 25A and 25B detect whether the locking member 13 is moved to the unlocking position. In first consideration of the safety relating to the driving of the vehicle, the state in which the locking member 13 is moved to the unlocking position is the safest. Therefore, the unlocking side is securely detected even if the breakdown is generated in one of the micro switches 25A and 25B. The actuation position detection unit is not limited to the micro switches 25A to 25C. Alternatively, a magnet is disposed in the locking member 13 and a magnetic force may be detected with a Hall element.

As illustrated in FIG. 1, the locking apparatus 10 is switched between a connected state in which the power can be supplied from the battery 3 and a disconnected state in which the power is not supplied by the upper-level microcomputer 1. In the connected state to the battery 3, the electric motor 15 is controlled by the lower-level microcomputer 27 mounted on the control board 26.

A connector 28 that is connected to the upper-level microcomputer 1 is mounted on the control board 26. An other-side connector is connected to the connector 28, whereby the connector 28 is electrically connected to the power supply control lines 4a and 4b and the communication line 2a, which are connected to the upper-level microcomputer 1. A constant-voltage circuit 29, a communication interface 30, and a motor driving control unit 31 are mounted on the control board 26 in addition to the electric motor 15, the micro switches 25A to 25C, and the lower-level microcomputer 27. In the embodiment, first and second switching units 34 and 46, first to third diagnostic units 41, 45, and 47, and a switch unit 37 are further mounted to be able to improve the safety against the breakdown.

In the constant-voltage circuit 29, a signal input unit is connected to the power supply control line 4a, a power input unit is connected to the battery 3, and a power output unit is connected to the lower-level microcomputer 27. When a start-up signal is input from the upper-level microcomputer 1, the power of 12 V supplied from the battery 3 is converted into the power of 5 V, and the power of 5 V is supplied to the lower-level microcomputer 27.

In the communication interface 30, a first signal input/output unit is connected to the communication line 2a, and a second signal input/output unit is connected to the lower-level microcomputer 27. The upper-level microcomputer 1 and the lower-level microcomputer 27 are connected so as to be able to conduct communication with each other.

The motor driving control unit 31 includes an unlocking relay 32 and a locking relay 33, which electrically connects and disconnects the battery 3 and the electric motor 15. A signal input unit of the unlocking relay 32 and a signal input unit of the locking relay 33 are connected to the lower-level microcomputer 27. A common connection terminal of the unlocking relay 32 is connected to one of pair of connection terminals of the electric motor 15, and a common connection terminal of the locking relay 33 is connected to the other connection terminal of the electric motor 15. A normally closed terminal of the unlocking relay 32 and a normally closed terminal of the locking relay 33 are grounded. A normally opened terminal of the unlocking relay 32 and a normally opened terminal of the locking relay 33 are connected via the second switching unit 46 to the battery 3. In the state in which neither the unlocking actuation signal nor the locking actuation signal is input from the lower-level microcomputer 27, as illustrated in FIG. 2A, the relays 32 and 33 are maintained in the grounded state to cut off the current passed through the electric motor 15. When the unlocking actuation signal is input from the lower-level microcomputer 27, as illustrated in FIG. 2B, the connection position of the unlocking relay 32 is switched to supply the power from one of connection terminal sides of the electric motor 15 on the condition that the first switching unit 34 and the second switching unit 46 are in an on-state (connected state), and the electric motor 15 is normally rotated to perform the unlocking actuation. When the locking actuation signal is input from the lower-level microcomputer 27, as illustrated in FIG. 2C, the connection position of the locking relay 33 is switched to supply the power from the other connection terminal side of the electric motor 15 on the condition that the first switching unit 34 and the second switching unit 46 are in the on-state (connected state), and the electric motor 15 is reversely rotated to perform the locking actuation.

As illustrated in FIGS. 1 and 2, the first switching unit 34 electrically connects and disconnects one side of a power supply route from the motor driving control unit 31 to the electric motor 15. The first switching unit 34 is a normally opened relay, and the first switching unit 34 is interposed in the power supply route such that one of connection terminals of the first switching unit 34 is connected to a common terminal of the locking relay 33 of the motor driving control unit 31, and such that the other connection terminal is connected to the electric motor 15. The first switching unit 34 becomes a closed (connection) state only when an on-signal is input from the microcomputers 1 and 27 through an AND circuit 35. In the AND circuit 35, an output unit is connected to the first switching unit 34, a first input unit is connected to the lower-level microcomputer 27, and a second input unit is connected to the power supply control line 4b. An AND determination whether the first switching unit 34 is opened or closed is made by the signals from the lower-level microcomputer 27 and the upper-level microcomputer 1, thereby preventing the first switching unit 34 from becoming the connected state due to a malfunction of the lower-level microcomputer 27.

The switch unit 37 is actuated when determining whether the electric motor 15 breaks down, and the switch unit 37 is interposed on the power supply route from a checking power supply 36 to the electric motor 15. The checking power supply 36 is connected between the first switching unit 34 and the electric motor 15, and applies the power of 5 V that does not actuate the electric motor 15. The switch unit 37, of which signal input unit is connected to the lower-level microcomputer 27, electrically connects and disconnects the check current supplied from the checking power supply 36 to the electric motor 15. The switch unit 37 becomes the closed (connection) state only when the on-signal is input from the lower-level microcomputer 27 to a signal input unit of the switch unit 37. The check current from the checking power supply 36 to the electric motor 15 is passed onto not the side of the electric motor 15 but the ground side through the locking relay 33, when the first switching unit 34 is in the connected state. Therefore, when making the determination whether the electric motor 15 breaks down, the first switching unit 34 is opened to pass the check current onto the side of the electric motor 15.

The switch unit 37 includes first and second resistors 38 and 39 and a transistor 40. In the first resistor 38, one end is connected to the lower-level microcomputer 27, and the other end is connected to a base electrode of the transistor 40. In the second resistor 39, one end is connected between the first resistor 38 and the base electrode of the transistor 40, and the other end is connected between the checking power supply 36 and an emitter electrode of the transistor 40. A collector electrode of the transistor 40 is connected between the first switching unit 34 and the electric motor 15 through the first diagnostic unit 41.

The first diagnostic unit 41 is connected to a route from the checking power supply 36 to the electric motor 15 to output a voltage corresponding to an internal resistance of the electric motor 15 to the lower-level microcomputer 27, whereby the lower-level microcomputer 27 determines whether the electric motor 15 breaks down. The first diagnostic unit 41 includes first to third resistors 42 to 44. In the first resistor 42, one end is connected to the emitter electrode of the transistor 40 of the switch unit 37, and the other end is connected to one end of the second resistor 43. The other end of the second resistor 43 is grounded. In the third resistor 44, one end is connected between the first and second resistors 42 and 43, and the other end is connected to an AD port of the lower-level microcomputer 27. A connection point of the first and second resistors 42 and 43 is connected between the electric motor 15 and the first switching unit 34. A potential at the connection point of the first and second resistors 42 and 43 is output to the lower-level microcomputer 27 through the third resistor 44.

The second diagnostic unit 45 is connected to the other side of the power supply route from the motor driving control unit 31 to the electric motor, and the voltage at the connection point of the second diagnostic unit 45 and the power supply route is output to the lower-level microcomputer 27, whereby the lower-level microcomputer 27 determines whether the motor driving control unit 31 breaks down. The second diagnostic unit 45 includes a step-down circuit that decreases the input voltage at a predetermined ratio and outputs the voltage. An input unit of the second diagnostic unit 45 is connected between the unlocking relay 32 of the motor driving control unit 31 and the electric motor 15, and an output unit is connected to the AD port of the lower-level microcomputer 27. As illustrated in FIG. 3, the second diagnostic unit 45 includes first to third resistors 50 to 52, a Zener diode 53, and a capacitor 54. In the first resistor 50, one end is connected to the power supply route, and the other end is connected to one end of the second resistor 51. The other end of the second resistor 51 is connected to the AD port of the lower-level microcomputer 27. In the third resistor 52, one end is connected between the first and second resistors 50 and 51, and the other end is grounded. In the Zener diode 53, one end is connected between the first and second resistors 50 and 51, and the other end is grounded. In the capacitor 54, one end is connected between the second resistor 51 and the AD port of the lower-level microcomputer 27, and the other end is grounded. When a voltage of 12 V of the battery 3 is applied to one end of the first resistor 50, the voltage is stepped down to about 5 V by the constant-voltage circuit including the first and third resistors 50 and 52 and the Zener diode 53. The voltage of about 5 V is output to the AD port of the lower-level microcomputer 27.

The second switching unit 46 is interposed on the power supply route from the battery 3 to the motor driving control unit 31. Specifically, the second switching unit 46 includes a relay, one end of which is connected to the battery 3, and the other end is connected to the unlocking relay 32 and the locking relay 33 of the motor driving control unit 31. The power supply control line 4a connected to the upper-level microcomputer 1 is connected to one of two signal input units, and the lower-level microcomputer 27 is connected to the other signal input unit. According to the signals from the upper-level microcomputer 1 and the lower-level microcomputer 27, the current from the battery 34 is electrically connected and disconnected. The electric motor 15 is not automatically actuated by providing the second switching unit 46, until the breakdowns are simultaneously generated in the first and second switching units 34 and 46 and the motor driving control unit 31.

The third diagnostic unit 47 includes a step-down circuit that decreases the input voltage at a predetermined ratio and outputs the voltage. An input unit of the third diagnostic unit 47 is connected between the second switching unit 46 and the motor driving control unit 31, and an output unit is connected to the AD port of the lower-level microcomputer 27. The voltage at the connection point to the input unit is output to the lower-level microcomputer 27, whereby the lower-level microcomputer 27 determines whether the second switching unit 46 breaks down. Because a specific structure of the third diagnostic unit 47 is identical to that of the second diagnostic unit 45 of FIG. 3, the detailed description is omitted.

The lower-level microcomputer 27 is operated according to a program stored in a ROM (not illustrated) that is a built-in storage means. The lower-level microcomputer 27 outputs an actuation signal to the unlocking relay 32 or the locking relay 33 of the motor driving control unit 31 according to the control signal input from the upper-level microcomputer 1. The lower-level microcomputer 27 determines the actuation position of the locking member 13 according to the inputs from the micro switches 25A to 25C. When the locking member 13 is moved to the unlocking position or the locking position, the lower-level microcomputer 27 outputs the state of the locking member 13 to the upper-level microcomputer 1.

The lower-level microcomputer 27 of the first embodiment acts as motor breakdown determination means that determines whether the electric motor 15 breaks down by the voltage input from the first diagnostic unit 41. The lower-level microcomputer 27 also acts as motor-driving-control-unit breakdown determination means that determines whether the motor driving control unit 31 breaks down by changes in voltages input from the first and second diagnostic units 41 and 45. The lower-level microcomputer 27 also acts as switching-unit breakdown determination means that determines whether the second switching unit 46 breaks down by the voltage input from the third diagnostic unit 47.

The microcomputers 1 and 27 of the first embodiment are connected by the power supply control line 4*a* and a power supply ensuring line 48. Whether on-output can be performed to the second switching unit 46 is determined by monitoring the input of the power supply control line 4*a* at the same time when the constant-voltage circuit 29 breaks down. The determination that the constant-voltage circuit 29 breaks down is made when the power is supplied to the lower-level microcomputer 27 while the input is not performed from the upper-level microcomputer 1 through the power supply control line 4*a*. When the control signal (unlocking actuation signal and locking actuation signal) is input from the upper-level microcomputer 1 through the communication line 2*a* and the communication interface 30 while the input is performed from the upper-level microcomputer 1 through the power supply control line 4*a*, the lower-level microcomputer 27 determines that the control signal from the upper-level microcomputer 1 is normal, and the lower-level microcomputer 27 outputs the on-signal to the second switching unit 46 to pass the current through the second switching unit 46.

Specifically, as illustrated in FIG. 4, whether the first switching unit 34 breaks down can be determined by detecting the voltage input from the first diagnostic unit 41 during the unlocking actuation and the locking actuation. Whether the second switching unit 46 breaks down can be determined by detecting the voltage input from the third diagnostic unit 47. Whether the unlocking relay 32 breaks down can be determined by detecting the voltages input from the first and second diagnostic units 41 and 45 during the unlocking actuation. Whether the locking relay 33 breaks down can be determined by detecting the voltages input from the first and second diagnostic units 41 and 45 during the locking actuation. Whether the open-circuit breakdown is generated in the electric motor 15 can be determined by detecting the voltage input from the first diagnostic unit 41 during the motor breakdown determination. Whether the on-breakdown is generated in the second switching unit 46, whether the short-circuit breakdown is generated in the electric motor 15, and whether the on-breakdown is generated in the first switching unit 34 can be determined by detecting the voltage input from the third diagnostic unit 47.

Next, the control of the locking apparatus 10 of the first embodiment including the vehicle-mounted upper-level microcomputer 1, which is performed by the lower-level microcomputer 27, will specifically be described below. In flowcharts of FIGS. 6 and 7 and flowcharts of FIGS. 9 and 10, in order to understand a relationship between the upper-level microcomputer 1 and the lower-level microcomputer 27, which are separately operated, steps performed by the upper-level microcomputer 1 and the lower-level microcomputer 27 are described in parallel, and the control signal transmitted through the power supply control lines 4*a* and 4*b* and the communication line 2*a* are described by a broken line.

Figure 6:
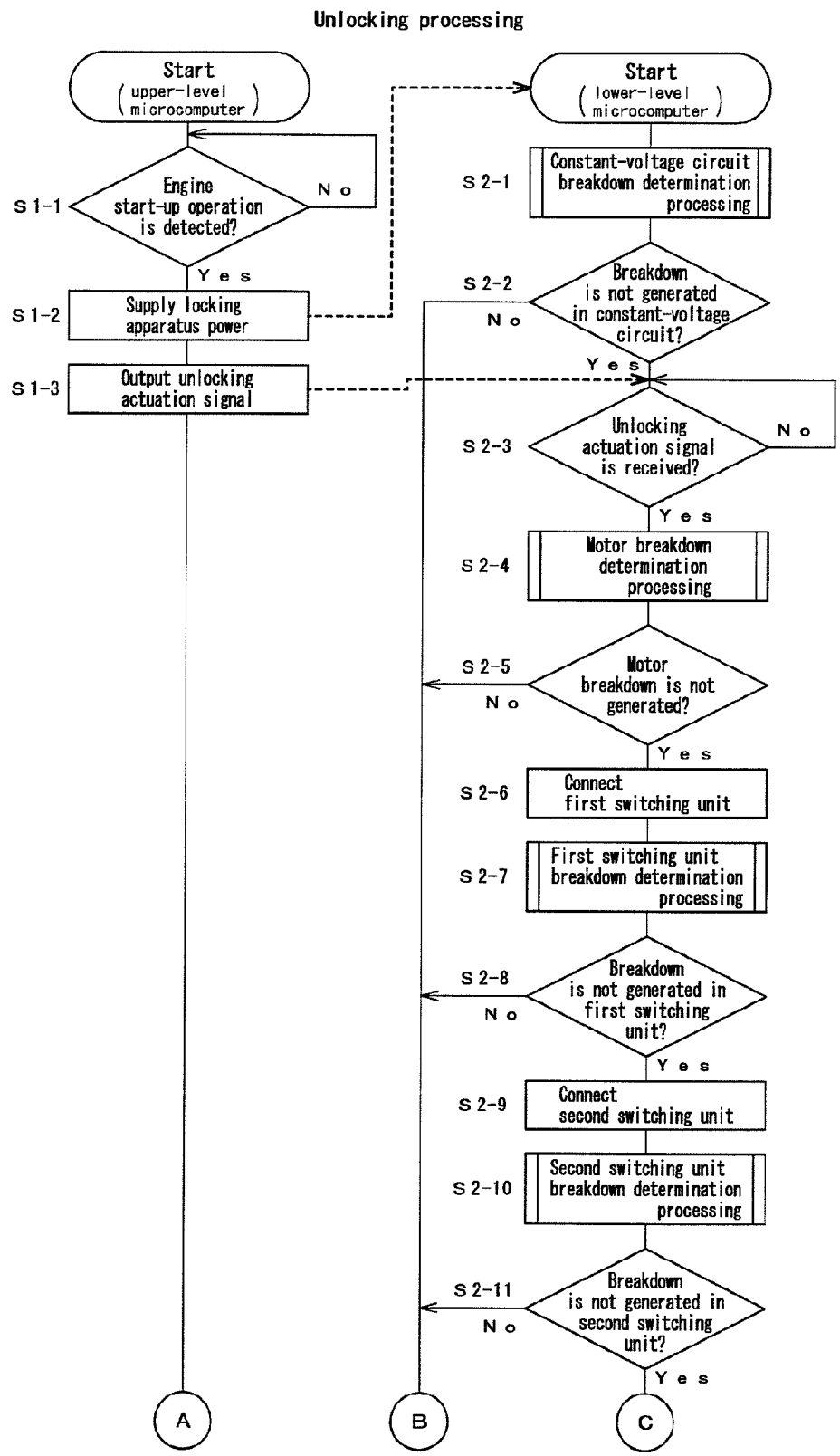
FIG. 6 is a flowchart illustrating unlocking processing performed by an upper-level microcomputer and a lower-level microcomputer.

In an unlocking processing, as illustrated in FIG. 6, the upper-level microcomputer 1 of the vehicle waits for a start-up operation of the ignition switch 5 in Step 51-1. When the upper-level microcomputer 1 detects the start-up operation of the ignition switch 5, the upper-level microcomputer 1 outputs an on-signal that puts the constant-voltage circuit 29 and the second switching unit 46 into the connected state through the power supply control line 4*a*, an ensuring signal that is output to the lower-level microcomputer 27 through the power supply ensuring line 48, and an on-signal that puts the AND circuit 35 into the connected state through the power supply control line 4*b* in Step S1-2. In Step S1-3, the upper-level microcomputer 1 outputs the unlocking actuation signal to the lower-level microcomputer 27 through the communication line 2*a*.

On the other hand, the lower-level microcomputer 27 of the locking apparatus 10 is started up from a reset state by supplying the power from the constant-voltage circuit 29. In Step S2-1, the started-up lower-level microcomputer 27 performs constant-voltage circuit breakdown determination processing. When determining that the constant-voltage circuit 29 does not break down in Step S2-2, the process in the lower-level microcomputer 27 goes to Step S2-3. When determining that the constant-voltage circuit 29 breaks down in Step S2-2, the process in the lower-level microcomputer 27 goes to Step S2-23 to output a corresponding breakdown signal to the upper-level microcomputer 1, and ends the unlocking processing.

In Step S2-3, the lower-level microcomputer 27 waits until receiving the unlocking actuation signal from the upper-level microcomputer 1. When receiving the unlocking actuation signal, the lower-level microcomputer 27 performs motor breakdown determination processing in Step S2-4. When determining that the electric motor 15 does not break down in Step S2-5, the process in the lower-level microcomputer 27 goes to Step S2-6. When determining that the electric motor 15 breaks down in Step S2-5, the process in the lower-level microcomputer 27 goes to Step S2-23 to output a corresponding breakdown signal to the upper-level microcomputer 1, and ends the unlocking processing. Preferably a step in which the lower-level microcomputer 27 ensures whether an ensuring signal is input from the upper-level microcomputer 1 through the power supply ensuring line 48 when receiving the unlocking actuation signal in Step S2-3 is added. In this case, when the ensuring signal is input, the lower-level microcomputer 27 determines that the received unlocking actuation signal is normal, and goes to Step S2-4. When the ensuring signal is not input, the lower-level microcomputer 27 determines that the received unlocking actuation signal is not normal, the process goes to Step S2-23 to output a corresponding breakdown signal to the upper-level microcomputer 1, and ends the unlocking processing.

In Step S2-6, the lower-level microcomputer 27 outputs an on-signal to the AND circuit 35 to put the first switching unit 34 into the connection (closed) state. In Step S2-7, the lower-level microcomputer 27 performs first-switching-unit breakdown determination processing. When determining that the first switching unit 34 does not break down in Step S2-8, the process in the lower-level microcomputer 27 goes to Step S2-9. When determining that the first switching unit 34 breaks down in Step S2-8, the process in the lower-level microcomputer 27 goes to Step S2-23 to output a corresponding breakdown signal to the upper-level microcomputer 1, and ends the unlocking processing.

In the first-switching-unit breakdown determination processing, the switch unit 37 is maintained in the on-state from the motor breakdown determination processing in Step S2-4. The current from the checking power supply 36 is passed onto not the side of the electric motor 15 but from the first switching unit 34 onto the ground side through the locking relay 33. Accordingly, the voltage (L<M<H) input from the first diagnostic unit 41 is changed from M to L. Therefore, the lower-level microcomputer 27 determines that the first switching unit 34 is normally operated when the voltage input from the first diagnostic unit 41 is changed from M to L, and the lower-level microcomputer 27 determines that the first switching unit 34 breaks down in other cases. When the first-switching-unit breakdown determination processing is ended, the lower-level microcomputer 27 rapidly puts the switch unit 37 into the off-state to stop the application of the check voltage from the checking power supply 36 to the electric motor 15.

In Step S2-9, the lower-level microcomputer 27 outputs the on-signal to the second switching unit 46 to put the second switching unit 46 into the connected state. In Step S2-10, the lower-level microcomputer 27 performs second-switching-unit breakdown determination processing. When determining that the second switching unit 46 does not break down in Step S2-11, the process in the lower-level microcomputer 27 goes to Step S2-12. When determining that the second switching unit 46 breaks down in Step S2-11, the process in the lower-level microcomputer 27 goes to Step S2-23 to output a corresponding breakdown signal to the upper-level microcomputer 1, and ends the unlocking processing.

In the second-switching-unit breakdown determination processing, when the second switching unit 46 is turned on, the voltage input from the third diagnostic unit 47 is changed from L to H. Therefore, the lower-level microcomputer 27 determines that the second switching unit 46 is normally operated when the voltage input from the third diagnostic unit 47 is changed from L to H, and the lower-level microcomputer 27 determines that the second switching unit 46 breaks down in other cases.

Figure 7:
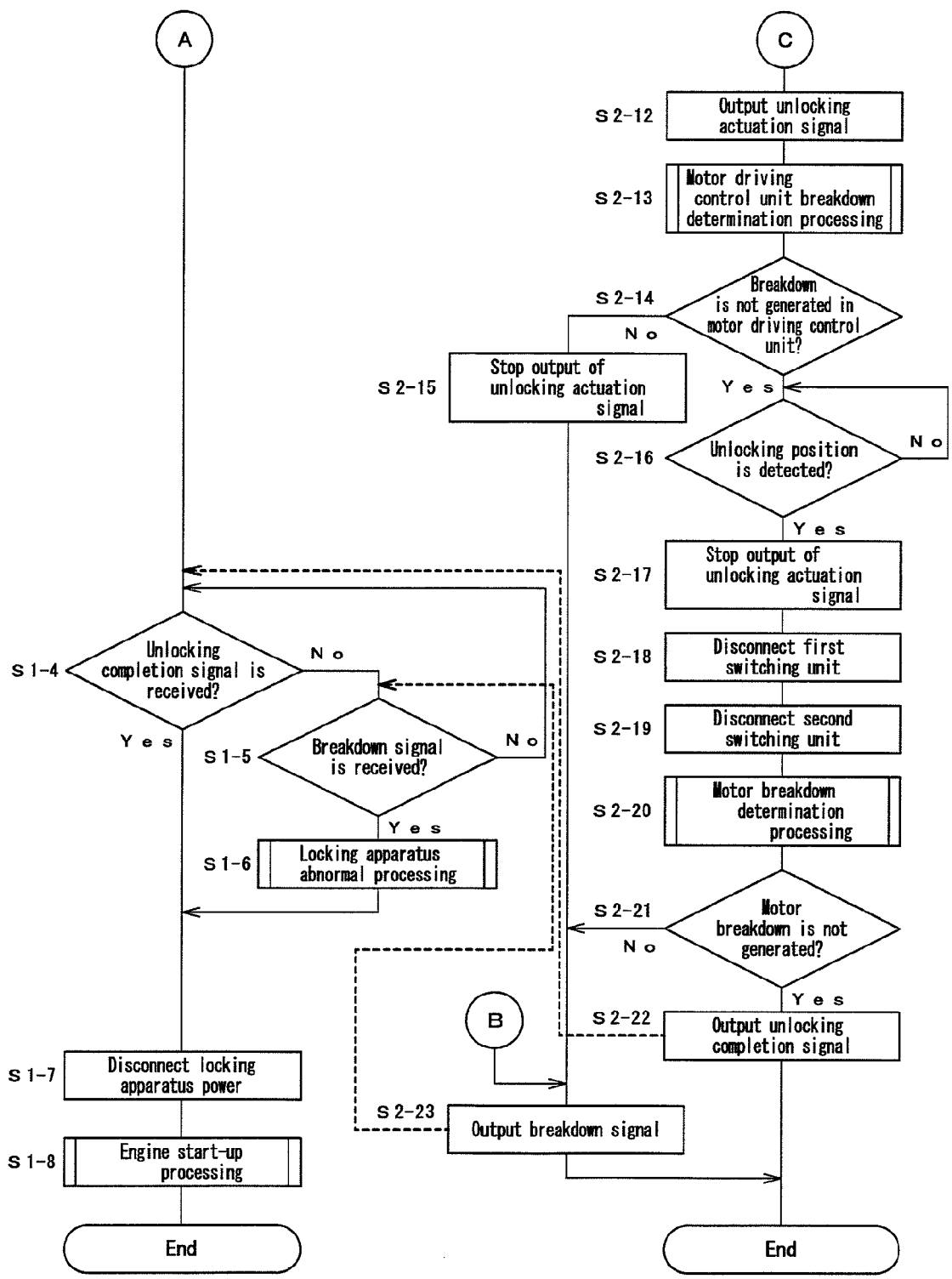
FIG. 7 is a flowchart subsequent to that of FIG. 6.

As illustrated in FIG. 7, the lower-level microcomputer 27 outputs the unlocking actuation signal to the motor driving control unit 31 in Step S2-12, and performs motor-driving-control-unit breakdown determination processing in Step S2-13. When determining that the motor driving control unit 31 does not break down in Step S2-14, the process in the lower-level microcomputer 27 goes to Step S2-16. When determining that the motor driving control unit 31 breaks down in Step S2-14, the process in the lower-level microcomputer 27 goes to Step S2-15 to stop the output of the unlocking actuation signal, goes to Step S2-23 to output a corresponding breakdown signal to the upper-level microcomputer 1, and ends the unlocking processing.

When the unlocking actuation signal is output to the motor driving control unit 31, the unlocking relay 32 is switched as illustrated in FIG. 2B, and the electric motor 15 is connected to the battery 3. The electric motor 15 rotates normally to move the locking member 13 from the locking position to the unlocking position. In the motor-driving-control-unit breakdown determination processing, the lower-level microcomputer 27 determines that the unlocking relay 32 is normally operated when the voltage input from the first diagnostic unit 41 is L while the voltage input from the second diagnostic unit 45 is H, and the lower-level microcomputer 27 determines that the unlocking relay 32 breaks down in other cases.

In Step S2-16, the lower-level microcomputer 27 waits until the micro switches 25A to 25C detects the movement of the locking member 13 to the unlocking position. When the locking member 13 is moved to the unlocking position, the process in the lower-level microcomputer 27 goes to Step S2-17 to stop the output of the unlocking actuation signal.

In Step S2-18, the lower-level microcomputer 27 stops the output of the on-signal to the AND circuit 35 to put the first switching unit 34 into the cutoff (opened) state. In Step S2-19, the lower-level microcomputer 27 stops the output of the on-signal to the second switching unit 46 to put the second switching unit 46 into the disconnected state. In Step S2-20, the lower-level microcomputer 27 performs the motor breakdown determination processing again. After the motor breakdown determination, the lower-level microcomputer 27 rapidly puts the switch unit 37 into the off-state to stop the application of the check voltage from the checking power supply 36 to the electric motor 15. When determining that the electric motor 15 does not break down in Step S2-21, the process in the lower-level microcomputer 27 goes to Step S2-22 to output an unlocking completion signal to the upper-level microcomputer 1, and ends the unlocking processing. When determining that the electric motor 15 breaks down in Step S2-21, the process in the lower-level microcomputer 27 goes to Step S2-23 to output a corresponding breakdown signal to the upper-level microcomputer 1, and ends the unlocking processing.

On the other hand, the upper-level microcomputer 1 that outputs the unlocking actuation signal in Step S1-3 detects whether the unlocking completion signal is received from the lower-level microcomputer 27 in Step S1-4. The process in the upper-level microcomputer 1 goes to Step S1-5 when the unlocking completion signal is not received, and the process in the upper-level microcomputer 1 goes to Step S1-7 when the unlocking completion signal is received.

In Step S1-5, the upper-level microcomputer 1 detects whether the breakdown signal is received from the lower-level microcomputer 27. When the breakdown signal is not received, the process in the upper-level microcomputer 1 returns to Step S1-4. When the breakdown signal is received, the process in the upper-level microcomputer 1 goes to Step S1-6 to perform locking apparatus abnormal processing, and goes to Step S1-7.

In Step S1-7, the upper-level microcomputer 1 stops the output of the on-signal to the constant-voltage circuit 29 through the power supply control lines 4a and 4b to stop the passage of the current through the locking apparatus 10. In Step S1-8, the upper-level microcomputer 1 performs engine start-up processing and ends the unlocking processing.

In the locking apparatus abnormal processing in Step S1-6, a repair request signal is output to inform a user (driver) of the breakdown state. The engine start-up processing in Step S1-8 is not performed except the on-breakdown of the first switching unit, which does not affect the unlocking processing and the locking processing, in the plural breakdown signals received from the lower-level microcomputer 27. That is, the engine start-up processing is performed only when the on-breakdown is generated in the first switching valve 34. However, because the motor breakdown determination processing cannot be performed when the on-breakdown is generated in the first switching valve 34, the repair request signal is also output to inform the user of the breakdown state.

Next, the pieces of motor breakdown determination processing in Steps S2-4 and S2-20 performed by the lower-level microcomputer 27 will specifically be described below.

In an initial state before the performance of the motor breakdown determination processing, the unlocking relay 32 and the locking relay 33 of the motor driving control unit 31, the first switching unit 34, the second switching unit 46, and the switch unit 37 are in the off-state.

Figure 8:
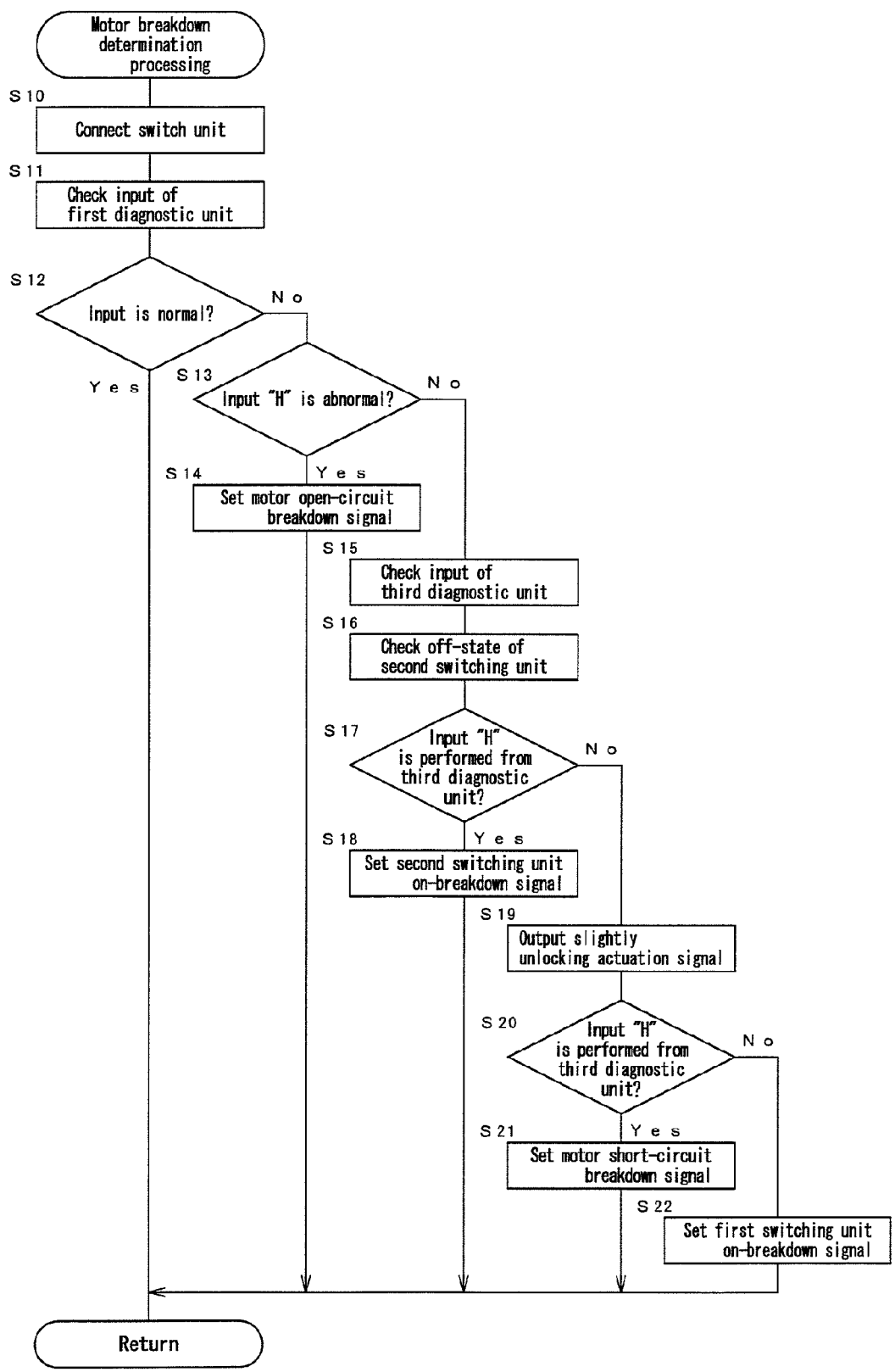
FIG. 8 is a flowchart illustrating motor breakdown determination processing in the unlocking processing.

In the motor breakdown determination processing, as illustrated in FIG. 8, the lower-level microcomputer 27 puts the switch unit 37 into the on-state to enable the check voltage to be applied from the checking power supply 36 to the electric motor 15 in Step S10. When the switch unit 37 becomes the on-state, the current is passed from the checking power supply 36 onto the ground side through the first resistor 42, the second resistor 43, the electric motor 15, and the unlocking relay 32. When each element is normal, the first diagnostic unit 41 outputs the voltage (M) that is divided by a resistance R1 of the first resistor 42, a resistance R2 of the second resistor 43, and an internal resistance Rm of the electric motor 15. Therefore, in Step S11, the input from the first diagnostic unit 41 is ensured. When the input voltage is a predetermined voltage (M) in Step S12, the lower-level microcomputer 27 determines that the electric motor is normal, and returns. When the input voltage is not M in Step S12, the lower-level microcomputer 27 determines that one of the electric motor 15, the first switching unit 34, and the second switching unit 46 breaks down, and the process goes to Step S13.

When the open-circuit breakdown is generated in the electric motor 15, the current is not passed through the unlocking relay 32, the voltage output from the first diagnostic unit 41 becomes H. The voltage output from the first diagnostic unit 41 becomes L in the case of other breakdowns. Therefore, in Step S13, the lower-level microcomputer 27 detects whether the voltage input from the first diagnostic unit 41 is H. When the input voltage is H, the lower-level microcomputer 27 determines that the open-circuit breakdown is generated in the electric motor 15. In Step S14, the lower-level microcomputer 27 sets a corresponding breakdown signal and returns. When the input voltage is not H (=input voltage L), the process in the lower-level microcomputer 27 goes to Step S15.

In Step S15, the lower-level microcomputer 27 ensures the voltage input from the third diagnostic unit 47. In Step S16, the lower-level microcomputer 27 ensures whether the second switching unit 46 is in the off-state. When the voltage input from the third diagnostic unit 47 is H in Step S17, the lower-level microcomputer 27 determines that the on-breakdown is generated in the second switching unit 46. In Step S18, the lower-level microcomputer 27 sets a corresponding breakdown signal and returns. When the input voltage is not H (=input voltage L), the process in the lower-level microcomputer 27 goes to Step S19.

In Step S19, the lower-level microcomputer 27 ensures that the second switching unit 46 is normal, and outputs the unlocking actuation signal. In Step S20, the lower-level microcomputer 27 detects whether the voltage input from the third diagnostic unit 47 is changed from L to H. When the voltage input from the third diagnostic unit 47 is changed from L to H, the lower-level microcomputer 27 determines that the short-circuit breakdown is generated in the electric motor 15. In Step S21, the lower-level microcomputer 27 sets a corresponding breakdown signal and returns. When the input voltage is maintained in L, the lower-level microcomputer 27 determines that the on-breakdown is generated in the first switching unit 34. In Step S22, the lower-level microcomputer 27 sets a corresponding breakdown signal and returns. The unlocking actuation signal output from the lower-level microcomputer 27 is rapidly stopped after the input from the third diagnostic unit 47 is measured.

Figure 9:
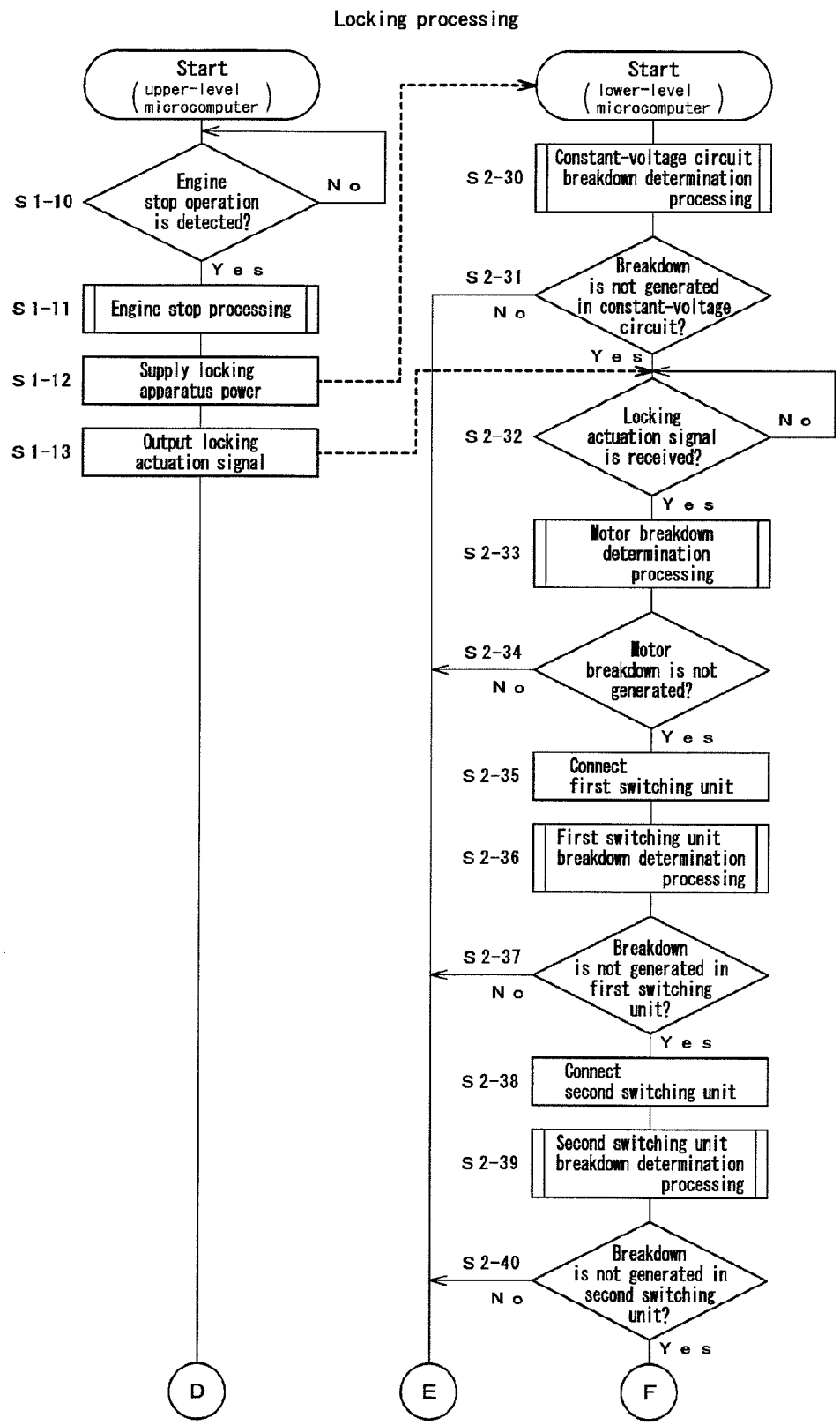
FIG. 9 is a flowchart illustrating locking processing performed by the upper-level microcomputer and the lower-level microcomputer.

In the locking processing, as illustrated in FIG. 9, the upper-level microcomputer 1 waits for a stop operation of the ignition switch 5 in Step S1-10. When the upper-level microcomputer 1 detects the stop operation of the ignition switch 5, the upper-level microcomputer 1 performs stopping the engine in step S1-11. After that, the upper-level microcomputer 1 outputs the on-signal that puts the constant-voltage circuit 29 and the second switching unit 46 into the connected state through the power supply control line 4a, the ensuring signal that is output to the lower-level microcomputer 27 through the power supply ensuring line 48, and the on-signal that puts the AND circuit 35 into the connected state through the power supply control line 4b in Step S1-12. In Step S1-13, the upper-level microcomputer 1 outputs the locking actuation signal to the lower-level microcomputer 27 through the communication line 2a.

On the other hand, the lower-level microcomputer 27 of the locking apparatus 10 is started up from a reset state by supplying the power from the constant-voltage circuit 29. In Step S2-30, the started-up lower-level microcomputer 27 performs the constant-voltage circuit breakdown determination processing similarly to that in Step S2-1. When determining that the constant-voltage circuit 29 does not breakdown in Step S2-31, the process in the lower-level microcomputer 27 goes to Step S2-32. When determining that the constant-voltage circuit 29 breaks down in Step S2-31, the process in the lower-level microcomputer 27 goes to Step S2-52 to output the corresponding breakdown signal to the upper-level microcomputer 1, and ends the locking processing.

In Step S2-32, the lower-level microcomputer 27 waits until receiving the locking actuation signal from the upper-level microcomputer 1. When receiving the locking actuation signal, the lower-level microcomputer 27 performs the motor breakdown determination processing in Step S2-33. When determining that the electric motor 15 does not break down in Step S2-34, the process in the lower-level microcomputer 27 goes to Step S2-35. When determining that the electric motor 15 breaks down in Step S2-34, the process in the lower-level microcomputer 27 goes to Step S2-52 to output the corresponding breakdown signal to the upper-level microcomputer 1, and ends the locking processing. Preferably a step in which the lower-level microcomputer 27 ensures whether the ensuring signal is input from the upper-level microcomputer 1 through the power supply ensuring line 48 when receiving the locking actuation signal in Step S2-32 as in the case of the unlocking processing is added. In this case, when the ensuring signal is input, the lower-level microcomputer 27 determines that the received locking actuation signal is normal, and the process goes to Step S2-33. When the ensuring signal is not input, the lower-level microcomputer 27 determines that the received locking actuation signal is not normal, goes to Step S2-52 to output the corresponding breakdown signal to the upper-level microcomputer 1, and ends the locking processing.

In Step S2-35, the lower-level microcomputer 27 outputs the on-signal to the AND circuit 35 to put the first switching unit 34 into the connected state. In Step S2-36, the lower-level microcomputer 27 performs the first-switching-unit breakdown determination processing similarly to that in Step S2-7. When determining that the first switching unit 34 does not breakdown in Step S2-37, the process in the lower-level microcomputer 27 goes to Step S2-38. When determining that the first switching unit 34 breaks down in Step S2-37, the process in the lower-level microcomputer 27 goes to Step S2-52 to output the corresponding breakdown signal to the upper-level microcomputer 1, and ends the locking processing.

In Step S2-38, the lower-level microcomputer 27 outputs the on-signal to the second switching circuit 46 to put the second switching unit 46 into the connected state. In Step S2-39, the lower-level microcomputer 27 performs the second-switching-unit breakdown determination processing similarly to that in Step S2-10. When determining that the second switching unit 46 does not break down in Step S2-40, the process in the lower-level microcomputer 27 goes to Step S2-41. When determining that the second switching unit 46 breaks down in Step S2-40, the process in the lower-level microcomputer 27 goes to Step S2-52 to output the corresponding breakdown signal to the upper-level microcomputer 1, and ends the locking processing.

Figure 10:
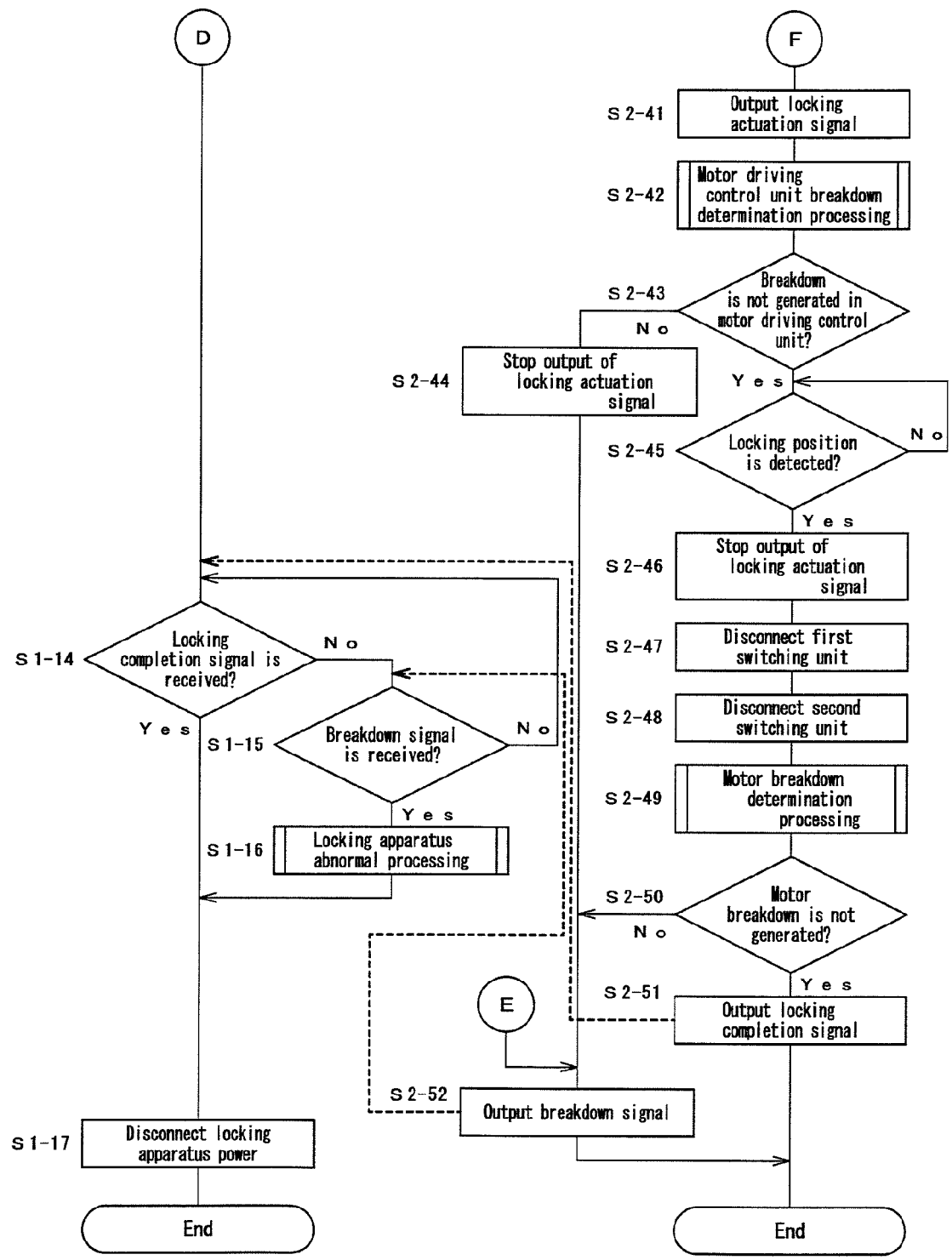
FIG. 10 is a flowchart subsequent to that of FIG. 9.

As illustrated in FIG. 10, the lower-level microcomputer 27 outputs the locking actuation signal to the motor driving control unit 31 in Step S2-41, and performs the motor-driving-control-unit breakdown determination processing in Step S2-42. When determining that the motor driving control unit 31 does not break down in Step S2-43, the process in the lower-level microcomputer 27 goes to Step S2-45. When determining that the motor driving control unit 31 breaks down in Step S2-43, the process in the lower-level microcomputer 27 goes to Step S2-44 to stop the output of the locking actuation signal, goes to Step S2-52 to output the corresponding breakdown signal to the upper-level microcomputer 1, and ends the unlocking processing.

When the locking actuation signal is output to the motor driving control unit 31, the locking relay 33 is switched as illustrated in FIG. 2C, and the electric motor 15 is connected to the battery 3. The electric motor 15 rotates reversely to move the locking member 13 from the unlocking position to the locking position. In the motor-driving-control-unit breakdown determination processing, when the voltage input from the second diagnostic unit 45 is L while the voltage input from the first diagnostic unit 41 is H, the lower-level microcomputer 27 determines that the locking relay 33 is normally operated. In other cases, the lower-level microcomputer 27 determines that the locking relay 33 breaks down.

In Step S2-45, the lower-level microcomputer 27 waits until the micro switches 25A to 25C detects the movement of the locking member 13 to the locking position. When the locking member 13 is moved to the locking position, the process in the lower-level microcomputer 27 goes to Step S2-46 to stop the output of the locking actuation signal.

In Step S2-47, the lower-level microcomputer 27 stops the output of the on-signal to the AND circuit 35 to put the first switching unit 34 into the disconnected state. In Step S2-48, the lower-level microcomputer 27 stops the output of the on-signal to the second switching unit 46 to put the second switching unit 46 into the disconnected state. In Step S2-49, the lower-level microcomputer 27 performs the motor breakdown determination processing again. After the motor breakdown determination, the lower-level microcomputer 27 rapidly puts the switch unit 37 into the off-state to stop the application of the check voltage from the checking power supply 36 to the electric motor 15. When determining that the electric motor 15 does not break down in Step S2-50, the process in the lower-level microcomputer 27 goes to Step S2-51 to output an locking completion signal to the upper-level microcomputer 1, and ends the locking processing. When determining that the electric motor 15 breaks down in Step S2-50, the process in the lower-level microcomputer 27 goes to Step S2-52 to output the corresponding breakdown signal to the upper-level microcomputer 1, and ends the locking processing.

On the other hand, the upper-level microcomputer 1 that outputs the locking actuation signal in Step S1-13 detects whether the locking completion signal is received from the lower-level microcomputer 27 in Step S1-14. The process in the upper-level microcomputer 1 goes to Step S1-15 when the locking completion signal is not received, and the process in the upper-level microcomputer 1 goes to Step S1-17 when the locking completion signal is received.

In Step S1-15, the upper-level microcomputer 1 detects whether the breakdown signal is received from the lower-level microcomputer 27. When the breakdown signal is not received, the process in the upper-level microcomputer 1 returns to Step S1-14. When the breakdown signal is received, the process in the upper-level microcomputer 1 goes to Step S1-16 to perform the locking apparatus abnormal processing similarly to that in Step S1-6, and goes to Step S1-17.

In Step S1-17, the upper-level microcomputer 1 stops the output of the on-signal to the constant-voltage circuit 29 through the power supply control lines 4a and 4b to stop the passage of the current through the locking apparatus 10, and ends the locking processing.

Because the pieces of motor breakdown determination processing in Steps S2-33 and S2-49 performed by the lower-level microcomputer 27 are identical to the motor breakdown determination processing during the unlocking processing of FIG. 8, the description is omitted.

In the locking apparatus 10 of the first embodiment, since the first switching unit 34 is provided between the motor driving control unit 31 and the electric motor 15, the current passed through the electric motor 15 in the non-actuation state can be cut off. Therefore, for example, even if the motor driving control unit 31 becomes the on-breakdown to supply the unintended power to the electric motor 15, the first switching unit 34 can prevent the passage of the current through the electric motor 15. Accordingly, the electric motor 15 can be prevented from unexpectedly rotating to cause the locking member to perform the locking actuation.

In the state in which both electrodes of the electric motor 15 are grounded by the motor driving control, the first switching unit 34 can prevent the current passed from the checking power supply 36 from being passed through the motor driving control unit 31 on the side opposite to the electric motor 15. Therefore, the check current can securely be passed through the electric motor 15. Accordingly, the first diagnostic unit 41 can detect the breakdown of the electric motor 15 to improve the safety against the breakdown. The cutoff and connection of the battery 3 and the cutoff and connection of the checking power supply 36 can be performed by the common first switching unit 34, so that the number of components can be decreased.

The second diagnostic unit 45 is further provided on the power supply route from the motor driving control unit 31 to the electric motor, and the breakdown of the motor driving control unit 31 can be detected by the changes in voltages input from the first and second diagnostic units 41 and 45. Therefore, the safety against the breakdown can further be improved. The first diagnostic unit 41 is commonly used to detect the breakdowns of the electric motor 15 and the motor driving control unit 31, so that the number of components can be suppressed.

The second switching unit 46 is provided to switch the connected state of the battery 3 and the motor driving control unit 31, and the third diagnostic unit 47 is provided to output the voltage at the connection point between the second switching unit 46 and the motor driving control unit 31. Therefore, the current can be prevented from being unexpectedly passed through the electric motor from the battery 3 until the breakdowns are simultaneously generated in the first and second switching units 34 and 46 and the motor driving control unit 31. Because the breakdown of the second switching unit 46 can be detected through the third diagnostic unit 47, the safety against the breakdown can further be improved.

Figure 11:
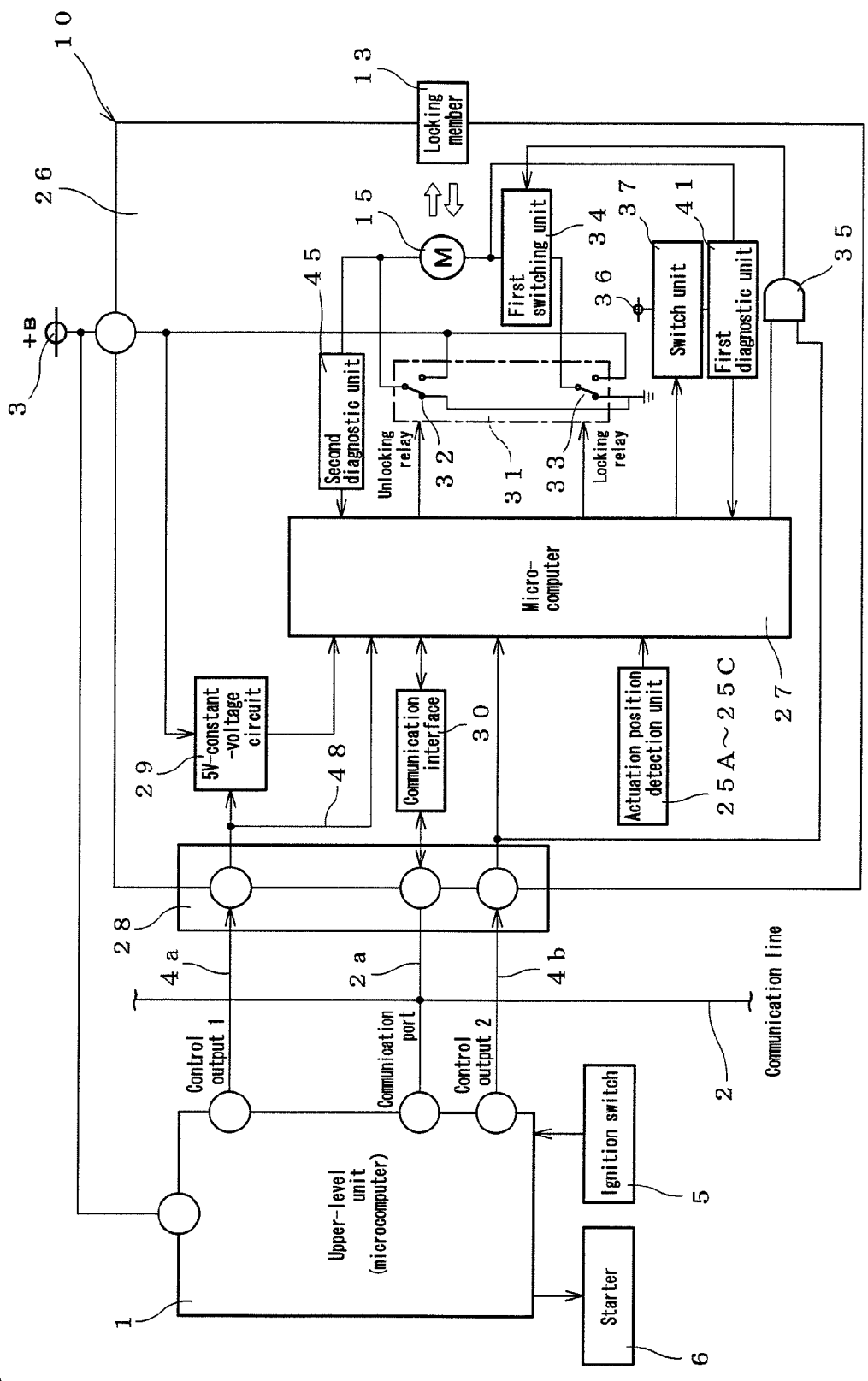
FIG. 11 is a circuit diagram illustrating a control circuit of an electric drive locking apparatus according to a second embodiment of the invention.
Figure 12:
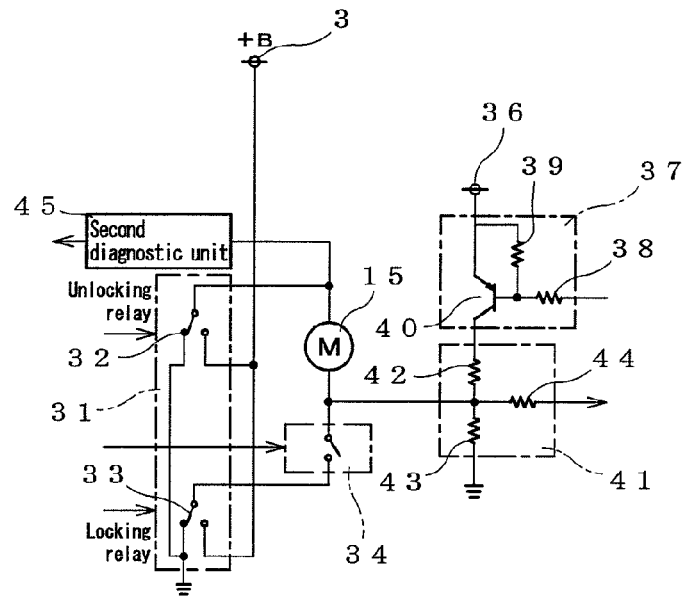
FIG. 12 is a circuit diagram illustrating a main part of FIG. 11.

FIGS. 11 and 12 illustrate a control circuit of an electric drive locking apparatus 10 according to a second embodiment of the invention. The second embodiment differs from the first embodiment in that the second switching unit 46 and the third diagnostic unit 47 are not provided.

In the locking apparatus 10 of the second embodiment, the unlocking processing illustrated in FIGS. 6 and 7 and the locking processing illustrated in FIGS. 9 and 10 are performed similarly to the first embodiment. In the motor breakdown determination processing, the second embodiment differs from the first embodiment in that not only the breakdown determination cannot be made in the second switching unit 46 of FIG. 4 and Steps S15 to S22, but also detailed breakdown contents such as the short-circuit breakdown of the electric motor 15 and the on-breakdown of the first switching unit 34 cannot be determined. However, in other points, the same effect as the first embodiment can be obtained.

The electric drive steering locking apparatus of the invention is not limited to the configurations of the embodiments, but various changes can be made.

For example, in the locking apparatus 10 of the second embodiment, the second diagnostic unit 45 may not be provided. That is, only the first switching unit 34, the checking power supply 36, the switch unit 37, and the first diagnostic unit 41 may be provided. Therefore, the unintended actuation of the electric motor 15 can be prevented in at least the non-actuation state, and whether the electric motor 15 breaks down can be determined.

Figure 13:
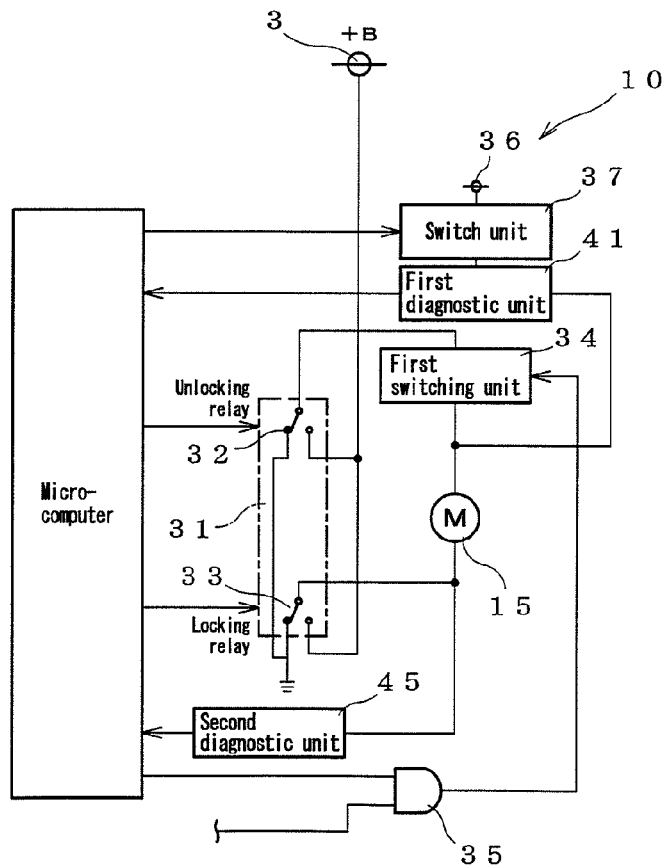
FIG. 13 is a circuit diagram illustrating a modification of the control circuit of the electric drive locking apparatus.

In the embodiments, the first switching unit 34 is provided between the electric motor 15 and the locking relay 33 of the motor driving control unit 31. Alternatively, as illustrated in FIG. 13, the first switching unit 34 may be provided between the electric motor 15 and the unlocking relay 32 of the motor driving control unit 31. In this case, the checking power supply 36 is provided between the electric motor 15 and the first switching unit 34, and the second diagnostic unit 45 is provided between the electric motor 15 and the locking relay 33 of the motor driving control unit 31. In the breakdown determination processing of the electric motor 15, the detailed breakdown determination of the electric motor 15 can be made by actuating the locking relay 33 instead of the unlocking relay 32.

What is claimed is:

1. An electric drive steering locking apparatus comprising:
    a motor that actuates a locking member engaging with and disengaging from a steering shaft of a vehicle;
    a motor driving control unit that switches polarities of a driving current supplied from a main power supply to the motor, disconnects the driving current, and allows the motor to perform locking actuation or unlocking actuation of the locking member;
    a microcomputer that selectively outputs an unlocking actuation signal causing the locking member to perform the unlocking actuation and a locking actuation signal causing the locking member to perform the locking actuation to the motor driving control unit;
    a first switching unit that electrically connects and disconnects one side of a power supply route from the motor driving control unit to the motor;
    a checking power supply that is connected between the first switching unit and the motor to apply a predetermined voltage to the motor;
    a switch unit that electrically connects and disconnects a check current supplied from the checking power supply to the motor;
    a first diagnostic unit that is connected on a route from the checking power supply to the motor to output a voltage corresponding to an internal resistance of the motor; and
    a motor breakdown determination unit that determines a breakdown of the motor by the voltage input from the first diagnostic unit.

2. The electric drive steering locking apparatus according to claim 1, further comprising:
    a second diagnostic unit that is connected to the other side of the power supply route from the motor driving control unit to the motor to output a voltage at a connection point of the second diagnostic unit and the power supply route; and
    a motor-driving-control-unit breakdown determination unit that determines a breakdown of the motor driving control unit by detecting changes of the voltages output from the first diagnostic unit and the second diagnostic unit.

3. The electric drive steering locking apparatus according to claim 1, further comprising:
    a second switching unit that electrically connects and disconnects a power supply route from a main power supply to the motor driving control unit;
    a second diagnostic unit that is connected between the second switching unit and the motor driving control unit to output a voltage at the connection point of the second diagnostic unit, the second switching unit and the motor driving control unit; and
    a switching-unit breakdown determination unit that determines the breakdown of the second switching unit by the voltage input from the second diagnostic unit.

4. The electric drive steering locking apparatus according to claim 2, further comprising:
    a second switching unit that electrically connects and disconnects a power supply route from a main power supply to the motor driving control unit;
    a third diagnostic unit that is connected between the second switching unit and the motor driving control unit to output a voltage at the connection point of the third diagnostic unit, the second switching unit and the motor driving control unit; and
    a switching-unit breakdown determination unit that determines the breakdown of the second switching unit by the voltage input from the third diagnostic unit.

* * * * *